US012781663B2

(12) United States Patent
Tian et al.

(10) Patent No.: US 12,781,663 B2
(45) Date of Patent: Nov. 3, 2026

(54) PURE OXYGEN COMBUSTION THREE-FLUID GAS TURBINE FOR POWER GENERATION

(71) Applicant: China University of Petroleum (East China), Qingdao (CN)

(72) Inventors: Yuanyu Tian, Qingdao (CN); Yingyun Qiao, Qingdao (CN); Yiliang Tian, Qingdao (CN); Peijie Zong, Qingdao (CN); Yanpeng Zhang, Qingdao (CN); Ruotong Cui, Qingdao (CN); Wenshuo Ma, Qingdao (CN); Aowen Hu, Qingdao (CN); Hongli Chen, Qingdao (CN); Chengbiao Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 19/421,340

(22) Filed: Dec. 16, 2025

(65) Prior Publication Data

US 2026/0168435 A1 Jun. 18, 2026

(30) Foreign Application Priority Data

Dec. 17, 2024 (CN) ......................... 202411864990.3

(51) Int. Cl.
*F02C 3/30* (2006.01)
*F02C 3/22* (2006.01)
(Continued)

(52) U.S. Cl.
CPC .................. *F02C 3/30* (2013.01); *F02C 3/22* (2013.01); *F02C 7/18* (2013.01); *F02C 3/305* (2013.01); *F02C 7/06* (2013.01); *F02C 7/16* (2013.01)

(58) Field of Classification Search
CPC ...... F02C 3/30; F02C 3/22; F02C 7/18; F02C 3/305; F02C 7/06; F02C 7/16
See application file for complete search history.

(56) References Cited

U.S. PATENT DOCUMENTS 6,120,245 A * 9/2000 Uematsu .................. F02C 7/18 415/178
6,224,327 B1 * 5/2001 Aoki ....................... F01D 5/085 415/114

(Continued)

FOREIGN PATENT DOCUMENTS

WO 1991005946 A1 5/1991

*Primary Examiner* — Phutthiwat Wongwian
*Assistant Examiner* — Rene D Ford
(74) *Attorney, Agent, or Firm* — Calfee, Halter & Griswold LLP

(57) ABSTRACT

The present disclosure provides a pure oxygen combustion three-fluid gas turbine for power generation, in which fuel gas, oxygen and steam in the combustion chamber are respectively controlled as required; there is no need for a complex airflow passage design and flow regulation and control; the pure oxygen combustion three-fluid gas turbine for power generation has a simple structure, a low cost, is easy to manufacture and assemble, and sets a basis for $CO_2$ recovery with low-energy consumption; for the first time, steam circulation is used to control the combustion temperature with low energy consumption, and steam cooling is also used to cool the moving blades and stationary vanes at low cost; besides, the initial combustion temperature can be improved by more than 100° C. with an equivalent high-temperature material, thereby the problem of steam cooling in existing gas turbines is solved.

10 Claims, 1 Drawing Sheet

(51) Int. Cl.

| | |
|---|---|
| ***F02C 7/18*** | (2006.01) |
| *F02C 7/06* | (2006.01) |
| *F02C 7/16* | (2006.01) |

(56) References Cited

U.S. PATENT DOCUMENTS

| | | | | |
|---|---|---|---|---|
| 6,477,773 | B1 * | 11/2002 | Wilson ...................... | F02C 7/18 29/889.1 |
| 2001/0000846 | A1 * | 5/2001 | Marushima ............. | F01D 25/12 60/785 |
| 2003/0046939 | A1 * | 3/2003 | Hyakutake ................ | F02C 7/16 60/782 |
| 2005/0025614 | A1 * | 2/2005 | Tiemann ................. | F01D 5/084 415/1 |
| 2023/0258106 | A1 * | 8/2023 | Terwilliger ............... | F02C 3/22 60/775 |
| 2025/0243802 | A1 * | 7/2025 | Tirumala .................. | F02C 3/30 |

* cited by examiner

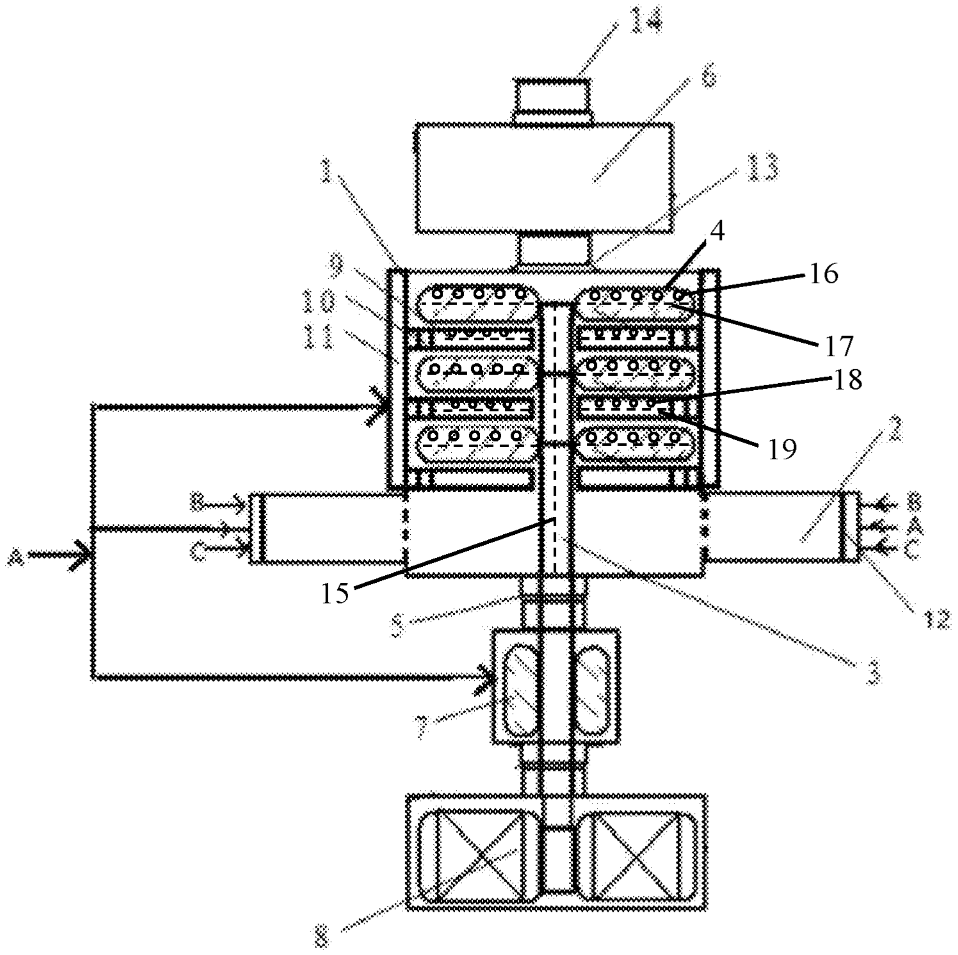
14
6
1
13
4
16
9
10
11
17
18
19
2
B
A
C
B
A
C
15
5
12
3
7
8

PURE OXYGEN COMBUSTION THREE-FLUID GAS TURBINE FOR POWER GENERATION

CROSS-REFERENCE TO RELATED APPLICATIONS

The application claims priority to Chinese Application No. 202411864990.3, filed on Dec. 17, 2024, the content of which is specifically and entirely incorporated herein by reference.

FIELD

The present disclosure relates to the technical field of gas turbines, in particular to a gas turbine structure for power generation.

BACKGROUND

Huge gas turbines are well-recognized as mechanical equipment that are the most difficult to manufacture in the world, and are known as the “jewel in the crown of manufacturing industry”. They may have high efficiency and high performance, and have economic benefit as well. The initial temperature of fuel gas and the compression ratio of compressor are two main factors affecting the efficiency of a gas turbine. The efficiency of a gas turbine can be improved significantly by increasing the initial temperature of fuel gas and increasing the compression ratio accordingly.

At the end of 1970s, the compression ratio was up to 31; the initial temperature of fuel gas was about 1,200° C. for industrial and marine gas turbines and higher than 1,350° C. for aviation gas turbines. Gas turbines are generally classified into four classes: Class E, having a working temperature of about 1,200° C.; Class F, having a working temperature of about 1,400° C.; Class G/H, having a working temperature of about 1,500° C.; and Class J, having a working temperature of about 1,600° C. The higher the gas intake temperature of a gas turbine is, the higher the class is and the higher the thermal efficiency is. At present, mainstream heavy-duty gas turbines are classified into Class E, Class F, and Class H, and advanced gas turbines in the world are of Class H, having 400 MW or higher rated output power.

However, in the working process of an existing gas turbine, the compressor continuously takes air from the atmosphere and compresses it; a part of the compressed air enters the combustion chamber, is mixed with the injected fuel and then combusted and becomes high-temperature gas, then the gas flows into the gas turbine, expands and does work, thereby pushes the turbine impeller to rotate with the compressor impeller; the working function of the heated high-temperature gas is significantly improved, thus, the gas turbine has residual power as the output mechanical work of the gas turbine while it drives the compressor. When the gas turbine is started from a resting state, it has to be driven by a starter to rotate, and the starter will not be disengaged until the gas turbine is accelerated enough to operate independently. However, due to the need for air with a high compression ratio to be divided into three parts—combustion air, turbine blade cooling air, and stationary vane cooling air—through complex air flow channels according to specific flow ratios and pressures, the forward design of a compressor with fewer stages but higher compression ratios, and a high precision and difficulty system structure for gas turbines featuring compressor-combustor-turbine chambers, has become a core challenge Steam cooling was a revolutionary technique for H-class gas turbines. It was first proposed by GE Company in the 1990s, and it utilized steam instead of air to cool the turbine stator vanes and rotor blades. This cooling technique is very efficient, and it can increase the inlet temperature of the first stage of moving blades of a turbine by about 110° C. under the condition of the same outlet temperature of the combustion chamber; in contrast, the inlet temperature can be improved only by 8° C. by means of improving the metal material itself. Unfortunately, owing to the excessively complex structure of the steam cooling system in actual commercial operation and the slow start-up of the steam system, which affected the peak shaving performance of the gas turbine, major gas turbine manufacturers finally had to choose air cooling in their actual products. It is urgent to apply the steam cooling technique in the development of the next generation of heavy-duty gas turbines.

In addition, at present, the design structures of most gas turbines have been directly evolved from aircraft jet engines. The turbine chamber, combustion chamber, compressor and generator are arranged horizontally in an axial direction, bringing strict requirements for temperature resistance and perpendicularity of the central shaft in processing and use, and a complex apparatus composed of rotating parts, bearings, seals, lubricating oil system and sophisticated electronic control devices is required. Owing to the technical complexity, most users have to rely on original equipment manufacturers to complete reparation, overhaul and advanced maintenance. Since the airflow direction of a coaxial compressor is non-adjustable, the high-temperature and high-speed direct-flow gas in the combustion chamber has to be guided by stationary vanes to become swirling airflow, and energy consumption is involved in this process; besides, a gas turbine used for power generation is not as compact as the jet engine of an aircraft in spatial arrangement. Therefore, it is one of the urgent tasks to develop a gas turbine that has high efficiency, a simple structure, a low manufacturing cost, is easy to manufacture and assemble, and has low maintenance and replacement costs, according to the fluid characteristics.

Owing to the reality of a fossil energy resource endowment of “rich in coal but lean in oil and gas” and a price ratio of about 1:7:3 of coal to oil to natural gas with the same heat value in China, coal-burning power will play a role of basic guarantee and peak shaving in the future low-carbon electricity-based energy system in China, and it is the safest and most economical energy in China, as well as the key and focus in building a safe, clean, efficient and low-carbon new energy system. Integrated gasification combined cycle (IGCC) power generation technology is regarded as a revolutionary technology for clean and efficient utilization of coal, can overcome the inherent defects of direct coal-fired power generation technology in terms of resource utilization, technology, economy, existing pollutant removal and $CO_2$ emission reduction, and is the main technology for coal-fired power generation in the future. The new IGCC technology, which is characterized by pure oxygen gasification of pulverized coal, pure oxygen combustion of gas for power generation, steam circulation for temperature regulation, and liquid nitrogen expansion for power generation, can realize full carbon recovery, deep peak shaving, water saving and high efficiency, and is expected to achieve coal-fired power generation with near zero emission and efficiency above 75% in the power plant, and greatly reduced coal consumption for power generation. Once a breakthrough is made in this technology, it will be a revolutionary clean coal-fired power generation technology.

However, it is urgent to develop a three-fluid gas turbine suitable for pure oxygen combustion for power generation.

SUMMARY

In order to overcome the drawbacks in the gas turbine structures in the prior art, the present disclosure provides a pure oxygen combustion three-fluid gas turbine for power generation, in which fuel gas, oxygen and steam in the combustion chamber are respectively controlled as required; there is no need for a complex airflow passage design and flow regulation and control; the pure oxygen combustion three-fluid gas turbine for power generation has a simple structure, a low cost, is easy to manufacture and assemble, and sets a basis for $CO_2$ recovery with low-energy consumption; for the first time, steam circulation is used to control the combustion temperature with low energy consumption, and steam cooling is also used to cool the moving blades and stationary vanes at low cost; besides, the initial combustion temperature can be improved by more than 100° C. (relative to a gas turbine grade) with an equivalent high-temperature material, thereby the problem of steam cooling in existing gas turbines is solved; the coaxial compressor is cancelled, thereby the length of the rotating shaft is greatly reduced and the rotating shaft can be vertically arranged, the difficulty and cost of manufacturing and assembly are reduced, and the maintenance and replacement costs are lower; liquid pure oxygen and water are pumped and pressurized with low energy consumption, and the medium-pressure fuel gas is compressed with low energy consumption, the compression ratio of the gas turbine is greatly improved, and the working efficiency of the gas turbine is greatly improved; the high-temperature flue gas produced in combustion is injected tangentially into the turbine chamber at a high speed, without changing the flow direction, and the momentum of the high-speed gas is fully utilized to further improve the power generation efficiency.

The technical scheme of the present disclosure is as follows:

The present disclosure provides a pure oxygen combustion three-fluid gas turbine for power generation, comprising:

- a turbine chamber;
- a combustion chamber having an inlet equipped with a three-fluid combustor configured to independently control fuel gas, oxygen, and circulating gas as required; wherein outlets of the combustion chamber are uniformly arranged along a circumference of a first end of the turbine chamber, and said outlets are oriented at an angle of 0 to 90 degrees relative to both an axial direction and a radial direction of the turbine chamber;
- a rotating shaft mounted along a central axis of the turbine chamber via bearings, said rotating shaft being provided with 2 to 9 stages of turbine blades; wherein a circulating gas cooling channel is formed at a center of the rotating shaft and is in fluid communication with circulating gas cooling channels within the turbine blades of the first 1 to 7 stages; and wherein surfaces of the turbine blades of the first 1 to 7 stages are provided with matrix-distributed circulating gas cooling holes;
- stationary vanes disposed on an inner wall of the turbine chamber and spaced apart from said turbine blades; wherein the stationary vanes of the first 1 to 7 stages are provided with circulating gas cooling channels therein, said channels being in fluid communication with circulating gas cooling channels within the turbine chamber; and wherein surfaces of said stationary vanes are provided with matrix-distributed circulating gas cooling holes;
- a diffuser, a heat exchanger, and a flue gas outlet arranged sequentially at a second end of the turbine chamber, the diffuser increases the pressure and decreases the velocity of the flue gas to reduce exhaust velocity loss; and
- a circulating gas seal box and a generator system arranged sequentially on the rotating shaft external to the first end of the turbine chamber; wherein the circulating gas seal box is in fluid communication with the circulating gas cooling channel at the center of the rotating shaft.

The rotating shaft is arranged vertically or horizontally, preferably arranged vertically.

The circulating gas is steam or $CO_2$, preferably is steam.

The outlet of the combustion chamber is rectangular or circular, preferably is a flat rectangular outlet.

The bearing is one of a sliding bearing, a rolling bearing, an air bearing and a magnetic levitation bearing, preferably is an air bearing.

The stationary vanes are mounted on a retaining ring, which is then mounted on the inner wall of the turbine chamber, and a heat-insulating material and a circulating gas cooling channel are sequentially arranged between the inner wall of the turbine chamber and the retaining ring, to ensure a low working temperature in the turbine chamber.

The heat exchanger is one of a braided packing heat exchanger, a tube-plate heat exchanger, a spiral-plate heat exchanger, a flat-plate heat exchanger and a plate-fin heat exchanger, and preferably is a braided packing heat exchanger.

BRIEF DESCRIPTION OF THE DRAWINGS

FIG. 1 is a schematic diagram of a pure oxygen combustion three-fluid gas turbine for power generation in the present disclosure.

In the figure: 1—turbine chamber, 2—combustion chamber, 3—rotating shaft, 4—turbine blade, 5—bearing, 6—heat exchanger, 7—circulating gas seal box, 8—generator system, 9—stationary vane, 10—heat-insulating material, 11—retaining ring, 12—three-fluid combustor, 13—diffuser, 14—flue gas outlet, A—circulating gas inlet, B—oxygen inlet, C—fuel gas inlet.

DETAILED DESCRIPTION

The present disclosure will be described below in detail with reference to the accompanying drawings:

The present disclosure provides a pure oxygen combustion three-fluid gas turbine for power generation, which comprises a turbine chamber 1, a combustion chamber 2, a rotating shaft 3, turbine blades 4, bearings 5, a heat exchanger 6, a circulating gas seal box 7, a generator system 8, stationary vanes 9, a heat-insulating material 10, a retaining ring 11, a three-fluid combustor 12, a diffuser 13 and a flue gas outlet 14, wherein a three-fluid combustor 12 for controlling fuel gas, oxygen and circulating gas respectively as required is provided at the inlet of the combustion chamber 2, and outlets of the combustion chamber 2 are uniformly arranged along the circumference of a first end of the turbine chamber 1, and form 0-90 degrees with respect to the axial direction and radial direction of the turbine chamber 1 respectively; the rotating shaft 3 is mounted in the turbine chamber 1 along the central axis through the bearings 5, the rotating shaft 3 is provided with 2-9 stages of turbine blades 4, a circulating gas cooling channel 15 is formed at the center of the rotating shaft 3 and is in communication with circulating gas cooling channels 17 in the turbine blades 4 in the first 1-7 stages, and circulating gas cooling holes 16 distributed in a matrix are formed in the surfaces of the turbine blades 4 in the first 1-7 stages; stationary vanes 9 are arranged on the inner wall of the turbine chamber 1 and spaced apart from the turbine blades 4, circulating gas cooling channels 19 are arranged in the first 1-7 stages of stationary vanes 9 and in communication with the circulating gas cooling channels in the turbine chamber, and circulating gas cooling holes 18 distributed in a matrix are provided in the surfaces of the stationary vanes 9; the diffuser 13, the heat exchanger 6 and the flue gas outlet 14 are sequentially arranged at the second end of the turbine chamber 1, the diffuser 13 increases the pressure and decreases the velocity of the flue gas to reduce exhaust velocity loss; the circulating gas seal box 7 and the generator system 8 are arranged sequentially on the outer rotating shaft 3 at the first end of the turbine chamber 1, and the circulating gas seal box 7 is in communication with the circulating gas cooling channel 15 at the center of the rotating shaft 3.

The pure oxygen combustion three-fluid gas turbine for power generation is arranged vertically or horizontally, preferably is arranged vertically.

The circulating gas is steam or $CO_2$, preferably is steam.

The outlet of the combustion chamber 2 is rectangular or circular, preferably is a flat rectangular outlet.

The bearing 5 is one of a sliding bearing, a rolling bearing, an air bearing and a magnetic levitation bearing, preferably is an air bearing.

The stationary vanes 9 are mounted on a retaining ring 11, which is then mounted on the inner wall of the turbine chamber 1, and a heat-insulating material 10 and a circulating gas cooling channel are sequentially arranged between the inner wall of the turbine chamber 1 and the retaining ring 9, to ensure a low working temperature in the turbine chamber 1.

The heat exchanger 6 is one of a braided packing heat exchanger, a tube-plate heat exchanger, a spiral-plate heat exchanger, a flat-plate heat exchanger and a plate-fin heat exchanger, and preferably is a braided packing heat exchanger.

During the operation of the pure oxygen combustion three-fluid gas turbine for power generation, high-pressure circulating gas is introduced through a circulating gas inlet A, high-pressure oxygen is introduced through an oxygen inlet B, and compressed fuel gas is introduced through a fuel gas inlet C respectively, into the three-fluid combustor 12 as required, and they are mixed and combusted there; thus, the problems of existing two-fluid gas turbines, such as difficulties in the control of the mix ratio of fuel gas to combustion air, difficulties in airflow channel design and manufacturing, and high-precision and challenging system design, are overcome, a compressor and a starter and their engagement and disengagement are avoided, and the flow rates of the fluids of the three-fluid combustor 12 can be adjusted simply and freely; the high-temperature and high-speed fuel gas is injected into the turbine chamber 1 in a tangential direction along the circumference of the first end of the turbine chamber 1, and directly pushes the turbine blades 4 to drive the rotating shaft to rotate at a high speed, and the high-frequency current generated by the coaxial high-speed rotating generator system 8 is converted into 50 HZ or 60 HZ current output through a frequency control system; the high-temperature flue gas flowing out of the center of the turbine chamber 1 exchanges heat with water or supercritical $CO_2$ in the heat exchanger to recover energy first, which is used for power generation with waste heat; and then the flue gas is discharged to recover $CO_2$. The high-pressure circulating gas is divided into three parts as required, which are respectively fed to the three-fluid combustor 12 for temperature regulation, fed to the turbine blade 4 for cooling protection, and fed to the stationary vanes 9 for cooling, thus the problem of utilizing complex flow channels to regulate compressed air flow in existing gas turbines is avoided, and the temperatures of the components can be adjusted simply and freely. Steam is preferred for the high-pressure circulating gas, and is used for cooling the moving blades and stationary vanes while the combustion temperature is regulated and controlled by steam circulation; thus, the challenge of adopting the revolutionary steam cooling technique in existing two-fluid gas turbines is overcome, the initial temperature of combustion can be improved by more than 100° C. with an equivalent high-temperature material, the gas turbines can be further improved by 1-3 classes, and gas turbines that are of Class J or a higher class can be developed easily; for the separation of deep cooling air at a low compression ratio and the high-pressure pumping of liquid oxygen with low energy consumption, it is unnecessary to use compressors with fewer stages and a higher compression ratio; besides, the medium-pressure fuel gas can be compressed with low energy consumption, thus, it is easy to break through the dilemma that the compression ratios of gas turbines can't reach 31; as a result, the compression ratios of gas turbines can be easily improved by folds, and are expected to reach 60-100, and the working efficiency can be improved by more than 40%. In pure oxygen combustion for power generation, deep cooling air separation is required, and it is more reasonable to separate the compressor from the gas turbine, thus, the length of the rotating shaft can be reduced by more than 60%, and the rotating shaft can be arranged vertically, thereby the difficulties in the design, manufacturing and assembly of the gas turbine are further reduced, the manufacturing cost of the gas turbine can be reduced by 50%, and the maintenance and replacement costs are lower.

By utilizing the above measures comprehensively, the difficulties in the forward design and manufacturing of the system structure of the pure oxygen combustion three-fluid gas turbine for power generation are greatly reduced, the flow rates and pressures of the fluids can be regulated and controlled freely, the heat and momentum can be utilized reasonably, the power generation efficiency is higher, the structure is simpler, the equipment size can be reduced by more than 50%, the cost can be reduced, and the manufacturing and assembling are easy, the maintenance and replacement costs are lower, NOx can be avoided in the flue gas, and the energy consumption and cost of $CO_2$ recovery can be reduced by more than 80%.

What is claimed is:

1. A pure oxygen combustion three-fluid gas turbine for power generation, comprising:
  - a turbine chamber;
  - a combustion chamber having an inlet equipped with a three-fluid combustor configured to independently control fuel gas, oxygen, and circulating gas as required; wherein outlets of the combustion chamber are uniformly arranged along a circumference of a first end of the turbine chamber, and said outlets are oriented at an angle of 0 to 90 degrees relative to both an axial direction and a radial direction of the turbine chamber;
  - a rotating shaft mounted along a central axis of the turbine chamber via bearings, said rotating shaft being provided with 2 to 9 stages of turbine blades; wherein a circulating gas cooling channel is formed at a center of the rotating shaft and is in fluid communication with circulating gas cooling channels within the turbine blades of the first 1 to 7 stages; and wherein surfaces of the turbine blades of the first 1 to 7 stages are provided with matrix-distributed circulating gas cooling holes;

2 to 9 stages of stationary vanes disposed on an inner wall of the turbine chamber and spaced apart from said turbine blades; wherein the first 1 to 7 stages of the stationary vanes are provided with circulating gas cooling channels therein, said circulating gas cooling channels of the stationary vanes of the first 1 to 7 stages being in fluid communication with the circulating gas cooling channels at the center of the rotating shaft and the circulating gas cooling channels of the turbine blades of the first 1 to 7 stages within the turbine chamber; and wherein surfaces of said stationary vanes are provided with matrix-distributed circulating gas cooling holes;

a diffuser, a heat exchanger, and a flue gas outlet arranged sequentially at a second end of the turbine chamber, the diffuser increases the pressure and decreases the velocity of the flue gas to reduce exhaust velocity loss; and a circulating gas seal box and a generator system arranged sequentially on the rotating shaft external to the first end of the turbine chamber; wherein the circulating gas seal box is in fluid communication with the circulating gas cooling channel at the center of the rotating shaft.

2. The pure oxygen combustion three-fluid gas turbine for power generation of claim 1, wherein the rotating shaft is arranged vertically or horizontally.

3. The pure oxygen combustion three-fluid gas turbine for power generation of claim 2, wherein the rotating shaft is arranged vertically.

4. The pure oxygen combustion three-fluid gas turbine for power generation of claim 1, wherein the circulating gas is steam or $CO_2$.

5. The pure oxygen combustion three-fluid gas turbine for power generation of claim 4, wherein the circulating gas is steam.

6. The pure oxygen combustion three-fluid gas turbine for power generation of claim 1, wherein each of the bearings is one of a sliding bearing, a rolling bearing, an air bearing and a magnetic levitation bearing.

7. The pure oxygen combustion three-fluid gas turbine for power generation of claim 6, wherein each of the bearings is the air bearing.

8. The pure oxygen combustion three-fluid gas turbine for power generation of claim 1, wherein the stationary vanes are mounted on a retaining ring, and the retaining ring is then mounted on the inner wall of the turbine chamber.

9. The pure oxygen combustion three-fluid gas turbine for power generation of claim 1, wherein the heat exchanger is one of a braided packing heat exchanger, a tube-plate heat exchanger, a spiral-plate heat exchanger, a flat-plate heat exchanger and a plate-fin heat exchanger.

10. The pure oxygen combustion three-fluid gas turbine for power generation of claim 9, wherein the heat exchanger is the braided packing heat exchanger.

* * * * *